United States Patent
Muzzo et al.

(10) Patent No.: US 10,591,083 B2
(45) Date of Patent: Mar. 17, 2020

(54) VALVE ACTUATING DEVICE WITH OPENING REDUCED SPEED

(71) Applicant: Luxembourg Patent Company S.A., Lintgen (LU)

(72) Inventors: Paul Muzzo, Yutz (FR); Jean-Claude Schmitz, Heisdorf (LU)

(73) Assignee: LUXEMBOURG PATENT COMPANY S.A., Luxembourg (LU)

( * ) Notice: Subject to any disclaimer, the term of this patent is extended or adjusted under 35 U.S.C. 154(b) by 275 days.

(21) Appl. No.: 15/535,674

(22) PCT Filed: Dec. 2, 2015

(86) PCT No.: PCT/EP2015/078373
§ 371 (c)(1),
(2) Date: Jun. 14, 2017

(87) PCT Pub. No.: WO2016/096436
PCT Pub. Date: Jun. 23, 2016

(65) Prior Publication Data
US 2017/0328490 A1    Nov. 16, 2017

(30) Foreign Application Priority Data
Dec. 16, 2014   (LU) .......................................... 92618

(51) Int. Cl.
*F16K 31/122* (2006.01)
*F15B 11/072* (2006.01)
(Continued)

(52) U.S. Cl.
CPC ...... *F16K 31/1221* (2013.01); *F15B 11/0725* (2013.01); *F16K 1/302* (2013.01);
(Continued)

(58) Field of Classification Search
CPC ................. F16K 31/1221; F16K 1/302; F16K 47/00–026; F15B 11/0725;
(Continued)

(56) References Cited

U.S. PATENT DOCUMENTS 3,427,930 A * 2/1969 Roberts et al.
4,343,228 A * 8/1982 Wallis
(Continued)

FOREIGN PATENT DOCUMENTS

| JP | S60113801 A | 6/1985 |
| WO | 2010097456 A1 | 9/2010 |

OTHER PUBLICATIONS

International Search Report from corresponding International Application No. PCT/EP2015/078373, dated Mar. 10, 2016.

*Primary Examiner* — Marina A Tietjen
(74) *Attorney, Agent, or Firm* — Sandberg Phoexnix & von Gontard PC

(57) ABSTRACT

The invention is directed to a valve actuating device comprising a body with a bore and a bottom, an actuating element sealingly housed in the bore of the body and forming a first chamber with the body, a piston sealingly extending through a bore in the actuating element, the piston and bore delimiting a second actuating chamber, a passage for an auxiliary fluid between the first and second chambers so that a movement of the piston in the bore of the actuating member can increase the pressure in the first chamber and move the actuating element. The fluid passage comprises a restriction and a check-valve, both arranged in parallel, so as to limit the flow of the auxiliary fluid from the second chamber to the first chamber.

20 Claims, 3 Drawing Sheets

(51) Int. Cl.
*F16K 1/30* (2006.01)
*F16K 47/00* (2006.01)
*F17C 13/04* (2006.01)

(52) U.S. Cl.
CPC .............. *F16K 47/00* (2013.01); *F17C 13/04* (2013.01); *F17C 2205/0323* (2013.01); *F17C 2205/0382* (2013.01); *F17C 2205/0394* (2013.01)

(58) Field of Classification Search
CPC .............. F17C 2205/0323; F17C 13/04; F17C 2205/0394; F17C 2205/0382
USPC ...................................... 251/48, 54, 62–63.6
See application file for complete search history.

(56) References Cited

U.S. PATENT DOCUMENTS

| | | | |
|---|---|---|---|
| 5,381,661 A | | 1/1995 | Malina |
| 5,884,895 A | * | 3/1999 | Wolz et al. |
| 5,971,353 A | * | 10/1999 | Johnson |
| 6,189,856 B1 | * | 2/2001 | Bowman |
| 6,244,563 B1 | * | 6/2001 | Ejiri |
| 7,434,780 B2 | * | 10/2008 | Hayashi et al. |
| 9,004,444 B2 | * | 4/2015 | Muzzo |
| 2012/0168653 A1 | * | 7/2012 | Ejiri |

* cited by examiner

VALVE ACTUATING DEVICE WITH OPENING REDUCED SPEED

CROSS-REFERENCE TO RELATED APPLICATIONS

The present invention is the US national stage under 35 U.S.C. § 371 of International Application No. PCT/EP2015/078373, which was filed on Dec. 2, 2015, and which claims the priority of application LU 92618 filed on Dec. 16, 2014, the content of which (text, drawings and claims) are incorporated here by reference in its entirety.

FIELD

The invention is directed to the field of valves for fluids, like compressed gas. More particularly, the invention is directed to the field of such valves that are operated by means of an actuator such as a compressed air actuator. The invention is directed to an actuator for a valve.

BACKGROUND

Prior art patent document published WO 2010/097456 A1 discloses a valve actuating device that is operated by compressed air. This device comprises a piston that converts the pressure of the compressed air into a larger pressure acting on an auxiliary fluid like lubricating oil that itself acts on a larger surface of an actuating element of the device. In other words, a limited pressure of the compressed air entering the actuating device is converted into a larger force that moves the actuating element of the device on a reduced stroke. That force acts against a stack of Belleville disk springs. The actuating device of this teaching results in a quick opening and closing of the valve. However for certain applications, like for UHP (Ultra High Purity) gases, more generally for gases that produce a substantial temperature increase during an adiabatic compression and that are likely to react exothermically (ignite and/or explode) further to that temperature increase, it can be desirable to achieve a progressive opening of the valve.

SUMMARY

The invention has for technical problem to provide a valve actuating device that achieves a slow opening of the valve and this with a simple and robust construction.

The invention is directed to a valve actuating device comprising: a body with a bore and a bottom; an actuating element sealingly housed in the bore of the body and forming a first chamber with the bottom of the body; a piston with a portion sealingly extending through a bore in the actuating element, the portion and bore delimiting a second actuating chamber; an auxiliary fluid in the first and second chambers; an auxiliary fluid passage between the first and second chambers so that a movement of the piston in the bore of the actuating member can increase the pressure in the first chamber and move the actuating element; remarkable in that the fluid passage between the first and second chambers comprises a restriction and a check-valve both arranged in parallel, so as to limit the flow of the auxiliary fluid from the second chamber to the first chamber.

According to various embodiments of the invention, the actuating element comprises a grip portion to be attached to a movable element of the valve, the grip portion sealingly protruding through an opening of the bottom of the body, the restriction and/or the check-valve being arranged on a face of the actuating element that is in vis-à-vis with the bottom of the body and that surrounds the grip portion.

According to various embodiments of the invention, the restriction and the check-valve are arranged at distinct locations at the periphery of the grip portion, the distinct locations being, in various instances, opposed diametrically.

According to various embodiments of the invention, the fluid passage between the first and second chambers comprises an internal groove in the bore of the actuating element.

According to various embodiments of the invention, the bore of the actuating element comprises a bottom, the internal groove being at the bottom.

According to various embodiments of the invention, the distance between a or the face of the actuating element that is in vis-à-vis with the bottom of the body and the cavity at the bottom level is less than 6 mm, in various instances less 5 mm, for example less than 4 mm.

According to various embodiments of the invention, the restriction and/or the check-valve has/have a longitudinal axis that is forms an angle of less than 30°, in various instances less than 20°, for example less than 10° with a longitudinal axis of the bore and the groove of the actuating element.

According to various embodiments of the invention, the actuating element comprises at least one offset bore on a or the face of the actuating element that is in vis-à-vis with the bottom of the body, the at least one offset bore intersecting the groove and housing the check valve or a plug with a restricted drill hole forming the restriction. The plug can be cap-shaped with a bottom wall and a side wall. The hole can be formed in the bottom wall. The side wall can comprise a thread on its external surface. It can also comprise a collar at its circular edge distal from the bottom wall, the collar being configured for resting in a tight manner on a shoulder portion formed in the actuating element.

According to various embodiments of the invention, the restriction is formed by a drill hole extending from a or the face of the actuating element that is in vis-à-vis with the bottom of the body, to the groove.

According to various embodiments of the invention, the restriction comprises an average diameter that is less than 0.5 mm, in various instances less than 0.2 mm, for example less than 0.1 mm.

According to various embodiments of the invention, the check valve is configured so as to open when the auxiliary fluid flows from the first chamber to the second chamber.

According to various embodiments of the invention, the auxiliary fluid in the first and second chambers is liquid, in various instances oil or an oil-like silicone liquid.

According to various embodiments of the invention, it comprises a spring urging the actuating element against the bottom of the body, the spring in various instances comprising a stack of Belleville disk springs.

According to various embodiments of the invention, the portion of the piston that extends through the bore of the actuating member is a first portion, the piston comprising a second portion of a larger diameter and sealingly housed in a further bore, the bore and second portion delimiting a third chamber with an port for compressed air for moving the piston towards the bottom of the body. The pressure of the compressed air can be comprised between 6 and 10 bar.

According to various embodiments of the invention, the port for compressed air comprises a device that restricts the passage when the air flows to fill the third chamber and that essentially does not restrict the passage when the air escapes from the chamber.

According to various embodiments of the invention, the diameter of the second portion of the piston is at least 2 times, in various instances at least 4 times, larger than the diameter of the first portion.

According to various embodiments of the invention, the diameter of bore of the body, that houses the actuating element is at least 2 times, in various instances at least 3 times, larger than the diameter of the bore of the element.

According to various embodiments of the invention, the bore of the body, that houses the actuating element; the bore of the actuating element; if present, the grip portion; and, if present, the further bore of the body; are aligned.

The invention has also for object a valve for a fluid, comprising: a seat; a closure member that is movable in translation along a main axis for cooperating with the seat for shutting-off of a fluid passage; an actuating device for actuating the closure member; remarkable in that the actuating device is according to the invention.

According to various embodiments of the invention, the movement of the actuating element, when the auxiliary fluid flows from the second chamber to the first chamber, opens the passage.

The invention is also directed to a system for outputting a gas stored in a compressed state in a gas cylinder, wherein the system comprises: a valve according to the invention; and a pneumatic control unit to be pneumatically connected between a compressed air source and the first chamber of the actuating device of the valve, the pneumatic control unit comprising a flow restrictor and in parallel a check valve oriented such as to close when filling the first chamber so as force the compressed air towards the flow restrictor, and to open when emptying the chamber so as to by-pass the restrictor.

The invention can also be directed to such a system for a valve with any kind of pneumatic actuating device, i.e. to a system for outputting a gas stored in a compressed state in a gas cylinder, wherein the system comprises: a valve with a pneumatic actuating device with a first actuating chamber; and a pneumatic control unit to be pneumatically connected between a compressed air source and the first chamber of the actuating device of the valve, the pneumatic control unit comprising a flow restrictor and in parallel a check valve oriented such as to close when filling the first chamber so as force the compressed air towards the flow restrictor, and to open when emptying the chamber so as to by-pass the restrictor. The first chamber can be delimited by a piston that cooperates with an hydraulic amplifier of the actuating effort, the amplifier in various instances comprising an auxiliary fluid, a flow a restriction and a check-valve both arranged in parallel, so as to limit the flow of the auxiliary fluid when opening the valve.

According to various embodiments of the invention, the pneumatic control unit further comprises a calibrated valve in parallel to the check valve and the flow restrictor, the calibrated valve being configured to open and by-pass the flow restrictor and the check valve during filling of the chamber as long as the difference of pressure between the compressed air source and the first chamber is above a first value.

According to various embodiments of the invention, the first value is comprised between 2 and 10 bar, in various instances between 3 and 8 bar, for example between 4 and 6 bar.

According to various embodiments of the invention, the calibrated valve is configured to close when the pressure in the first chamber is above a second value.

According to various embodiments of the invention, the second value is comprised between 1 and 5 bar, in various instances between 2 and 4 bar.

According to various embodiments of the invention, the pneumatic control unit is mounted on the valve, preferable on the valve actuator.

The invention is particularly interesting in that it provides a slower movement in one direction than in the other one, and this with a compact and robust construction. Indeed, the presence of a restriction in the passage for the auxiliary fluid between the first and second chamber is quite efficient for achieving a reliable slowdown of the movement on one stroke. The way of providing the restriction in accordance with the invention is particularly advantageous in that it can be easily performed industrially.

DRAWINGS

DETAILED DESCRIPTION

Figure 1:
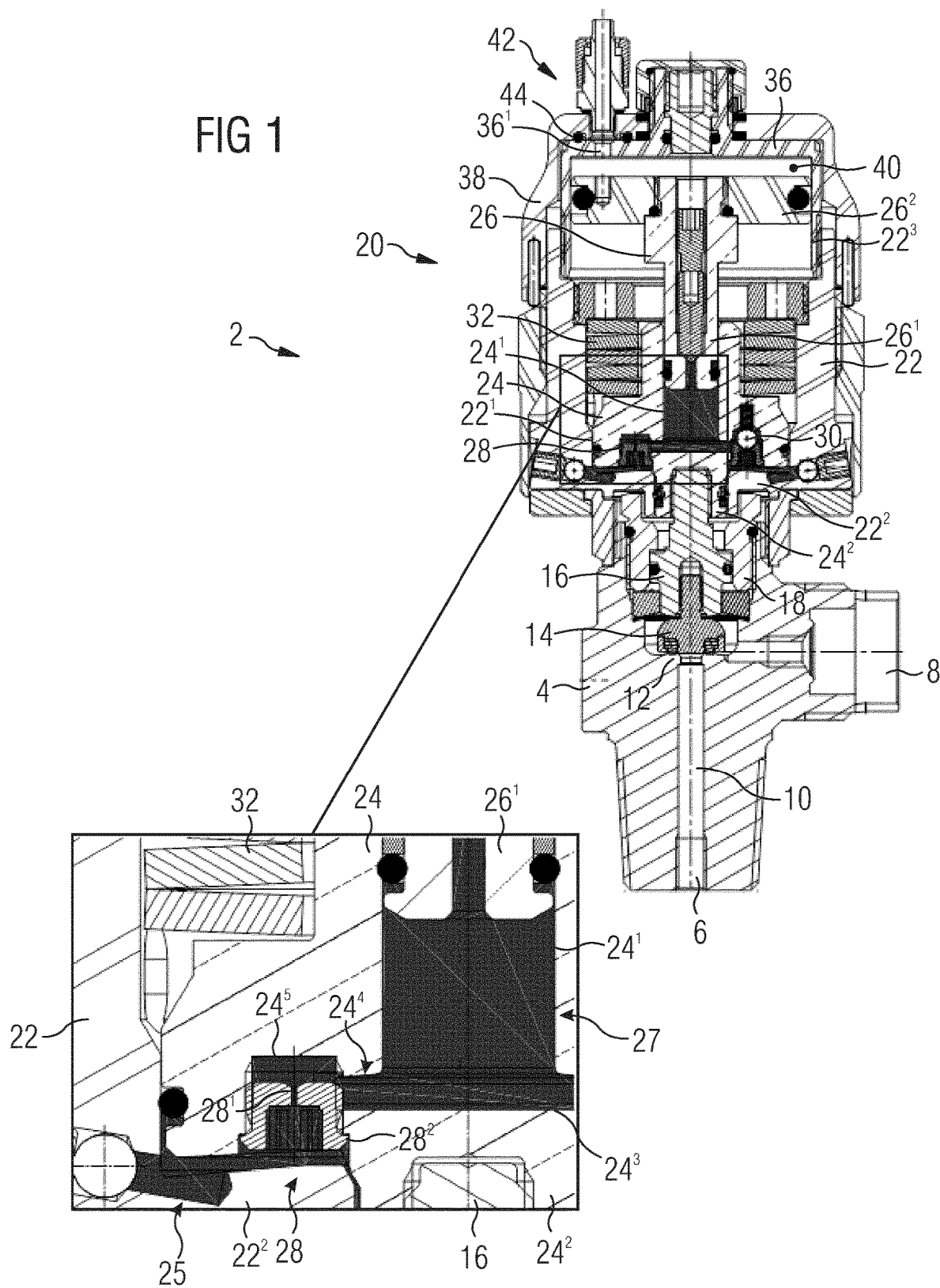
FIG. 1 is a sectional view of a valve equipped with an actuating device, in accordance with various embodiments of the invention.

FIG. 1 is a sectional view of a valve equipped with an actuating device according to various embodiments of the invention. The section is made along a plane that comprises the longitudinal axis of the valve and the device. This axis is vertical in the present figures.

In FIG. 1, the valve is kept in a closed state by the actuating device, in the absence of compressed air in the device.

The valve 2 comprises a valve body 4 with an inlet 6 and an outlet 8 for a fluid like a pressurized gas. The valve body 4 comprises also a fluid passage 10 interconnecting the inlet 6 with the outlet 8. A seat 12 is formed in the valve body 4 and surrounds the passage 10. A closure member 14 is movable in a cavity of the valve body 4 so as to cooperate with the seat 12 in order to shut-off the passage 10. In the present embodiment, the closure member 14 is attached to an intermediate member 16 that is guided by a sleeve 18 screwed on the valve body 4. The closure member 14 is attached via the intermediate member 16 to an actuating element of the actuating device 20.

The actuating device 20 comprises a body 22 with a bore $22^1$ that houses the actuating element 24 in a fluid tight manner. To that end, the actuating element 24 can comprise on its external generally cylindrical surface a groove with a seal that contacts the bore $22^1$ of the body 22. The bore $22^1$ of the body 22 comprises a bottom $22^2$ that delimits with the lower face of the actuating element 24 that is in vis-à-vis with the bottom $22^2$, a first chamber 25 that is filled with an auxiliary fluid. The fluid can be liquid, e.g. lubricating oil.

The actuating device 20 comprises also a piston 26 with a first portion $26^1$ that cooperates in a fluid tight manner with a bore $24^1$ in the actuating element 24. The bore $24^1$ of the actuating element 24 opens at a face of the element that is opposite to the lower one, i.e. vis-à-vis with the bottom $22^2$ of the body 22. The first portion $26^1$ of the piston 26 delimits with the bore $24^1$ a second chamber 27 that communicates with the first chamber 25 via a fluid restriction 28 and a check-valve 30, the restriction 28 and check-valve 30 being fluidly arranged in parallel between the two chambers.

The actuating element 24 is resiliently biased towards the bottom $22^2$ of the body 22 by a spring 32. This latter can comprise a stack of Belleville washer springs. These washers are fitted around a cylindrical portion of the actuating element 24 and abut at one end on a shoulder of the cylindrical portion and at the other end on a ring 34 that is fastened to the body by a threaded engagement.

The piston 26 comprises also a second portion $26^2$ that cooperates in a fluid tight manner with a further bore $22^3$ of the body 22. In the present particular embodiment, that body part is made in a separate cap-shaped element 36 that is fixed to the body 22 via a threaded engagement. The second portion $26^2$ of the piston 26 forms with the further bore $22^3$ a third chamber 40 that can be filled with compressed air. To that end the cap-shaped element 36 comprises on its upper wall a gas passage $36^1$. A cap-shaped hand-wheel 38 is rotatably fitted around the cap-shaped element 36 and comprises on its upper wall a port 42 for connecting a source of compressed air. A gasket 44 is housed in a groove on the interior side of the upper wall of the hand-wheel 38 and circumvents the port 42. The gasket 44 provides therefore a gas tight connection between the gas passage $36^1$ in the upper wall of the cap-shaped element 36 and the port 42 on the upper wall of the hand-wheel 38 when these gas passages are aligned. Since these are offset relative to the rotation axis of the hand-wheel 38, compressed air supplied at the port 42 of the hand-wheel 38 can flow into the chamber 40 only when the port 42 is aligned with the gas passage $36^1$. In other words, by adequately rotating the hand-wheel 38, compressed air can be supplied or not to the chamber 40.

The upper and exterior surface of the upper wall of the cap-shaped element 36 can be flat enough to remain in gas tight contact with the gasket 44 while the hand-wheel 38 is positioned such that the port 42 is out of alignment with the gas passage $36^1$, so that the compressed air supplied at the port 42 does not unintentionally flow at the ambient.

The first and second portions $26^1$ and $26^2$ of the piston are in various instances rigidly linked to each other. The effective external diameter of the second portion $26^2$ is larger, in various instances at least two times larger, for example at least four times larger, than the diameter of the first portion $26^1$. The pressure that is applied to the second portion $26^2$ of the piston can therefore be amplified in the second chamber 27 delimited by the first portion $26^1$.

The operation of the valve is as follows. When compressed air, or any compressed fluid, is supplied to the third chamber 40, the force resulting from the pressure of the air on the second portion $26^2$ of the piston 26 is transmitted to the first portion $26^1$ which generates a higher pressure in the second chamber 27. The auxiliary fluid in that chamber can flow to the first chamber 25 only via the restriction 28. Particularly, the check-valve 30 is arranged so as to open only when the auxiliary fluid flows from the first chamber 25 to the second chamber 27. The restriction can have an average or constant diameter that is less than 0.5 mm, in various instances less than 0.2 mm, for example less than 0.1 mm. The flow of the auxiliary fluid from the second chamber 27 to the first chamber 25 is therefore slowed down so as to provide a progressive opening of the valve.

The auxiliary fluid flowing from the second chamber 27 to the first chamber 25 increases the pressure in the first chamber 25 to the level of the pressure in the second chamber 27. The effective surface of the actuating element 24 that is subject to the pressure of the auxiliary fluid in the first chamber 27 can be larger than the effective surface of the first portion $26^1$ of the piston 26, thereby providing an additional amplification of the force that is exerted to the actuating element 24. Further, to the increase of pressure in the first chamber 25, the resulting force exerted on the actuating element 24 has for effect to move it away from the bottom $22^2$ of the body 22, against the resilient force of the spring 32.

The actuating element 24 comprises a grip portion $24^2$ that protrudes away from the second chamber 27 through an opening in the bottom $22^2$ of the body 22. The grip portion $24^2$ can comprise at least one groove on its external surface so as to contact, in a fluid tight manner, the interior surface of the opening in the bottom $22^2$. The above mentioned intermediate member 16 is mechanically engaged with the grip portion $24^2$. The lift movement of the actuating element 24 has therefore for effect to lift also the closure member 14 and to open the valve 2.

FIG. 1 comprises a magnified view of an area of the actuating device 20 that comprises the first and second chambers 25 and 27, and the restriction 28. It can be observed that the restriction is offset with regard to the longitudinal axis of the actuating element 24. It can also be observed that the restriction has its longitudinal axis essentially parallel to the main longitudinal axis. An internal groove $24^4$ is made in the bore $24^1$, in various instances at the level of the bottom $24^3$ of the bore. The groove forms a passage between the bore $24^1$ of the actuating element 24 and the restriction 28 and also the check-valve which are both laterally distant from the bore. Particularly, the grip portion $24^2$ for actuating the closure member of the valve occupies the central portion of the first chamber so that the restriction and the check-valve have to be shifted to offset positions.

In various embodiments, the restriction is formed by a plug 28 that is screwed in an offset bore $24^5$ in the (lower) face of the actuating element 24 that delimits the first chamber 25. The offset bore $24^5$ intersects the groove $24^4$ so as to provide a passage for the auxiliary fluid between the first and second chambers.

As is apparent in the magnified area in FIG. 1, the plug 28 is cap-shaped and comprises in its bottom wall a through-hole $28^1$ of a reduced diameter. The side wall of the plug 28 is threaded and comprises a collar $28^2$ for resting on a shoulder portion formed around the offset bore $24^5$. The plug can be made of any metal, in particular stainless steel. The through-hole $28^1$ can be made by drilling or via a laser beam. A laser beam can be from diameters of less than 0.2 mm, for example less than 0.1 mm.

The restriction can also be made by directly drilling the material of the actuating element 24. Generally, performing drill holes of reduced diameters, e.g. less than 1 mm, is difficult and is, a general practical rule, limited to a drill depth that corresponds to about 10 times the diameter. This means that for a hole with a diameter of 0.5 mm, it is desirable, for industrial and practical reasons, that the drill depth does not exceed 5 mm. Similarly, for a diameter of 0.4 mm, the drill depth shall not exceed 4 mm. In other words, this means that for practicing a restriction between the first and second chambers 25 and 27, it is particularly advantageous to perform the groove $24^4$ that provides a passage from the bore $24^1$ to a portion of material of the actuating element 24 that is in contact with the first chamber 25 and that has a reduced thickness, e.g. less than 5 or 4 mm.

The restriction can also be made by laser drilling, i.e. by applying a laser beam to the material of the actuating element 24. Similar constraints to those mentioned here above apply to laser drilling.

Figure 2:
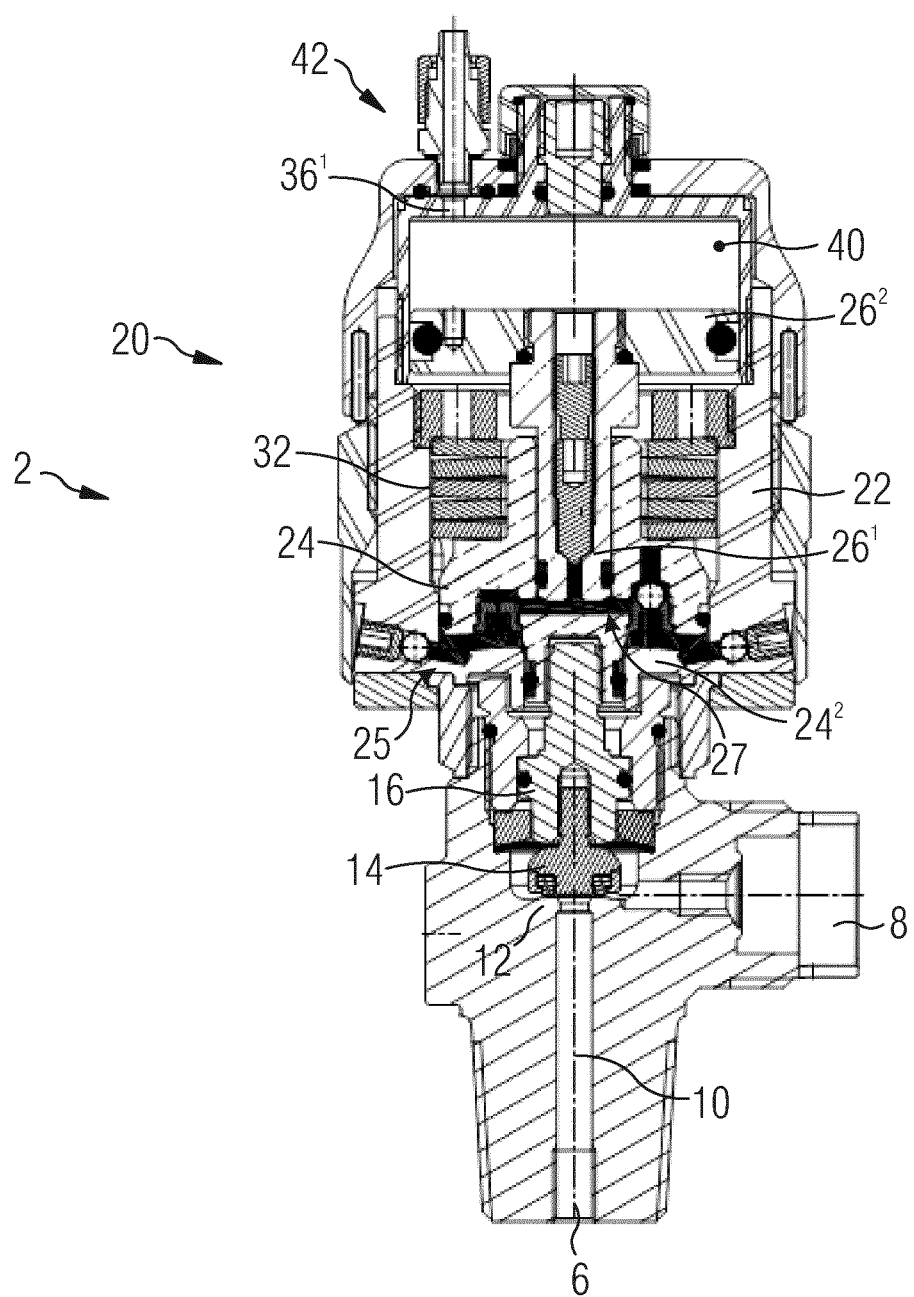
FIG. 2 is a section view of the valve and the actuating device of FIG. 1 where however the valve is in an open position, in accordance with various embodiments of the invention.

FIG. 2 is a sectional view of the valve of FIG. 1 in the opened state. Compressed gas has filled the third chamber 40 and has lowered the piston 26. This movement of the piston 26 has moved a portion of the auxiliary fluid from the second chamber 27 to the first chamber 25. This movement of the fluid has then exerted an effort on the actuating element 24 and has lifted it against the elastic biasing effect of the spring 32. The grip portion $24^2$ has then moved the intermediate member 16 and the closure member 14 away from the seat 12 so as to open the passage 10 between the inlet 6 and the outlet 8.

During the above mentioned opening movement, the flow of the auxiliary fluid from the second chamber 27 to the first chamber 25 was slowed down due to the restriction 28. Particularly, dependent on the viscosity of the fluid, the restriction can provide an opening time that exceeds 1 second, in various instances 2 seconds, for example 3 seconds.

When the pressure of the compressed air in the third chamber 40 is released, the pressure in the second chamber 27 drops and the auxiliary fluid can flow through the check-valve from the first chamber 25 to the second chamber 27. The biasing force of the spring 32 is converted into pressure in the first and second chambers, and the pressure pushes the piston back to its initial position when the valve is closed.

Although not shown in the figures, the port for compressed air can comprise a device that restricts the passage when the air flows to fill the third chamber 40 and that essentially does not restrict the passage when the air escapes from the chamber.

Figure 3:
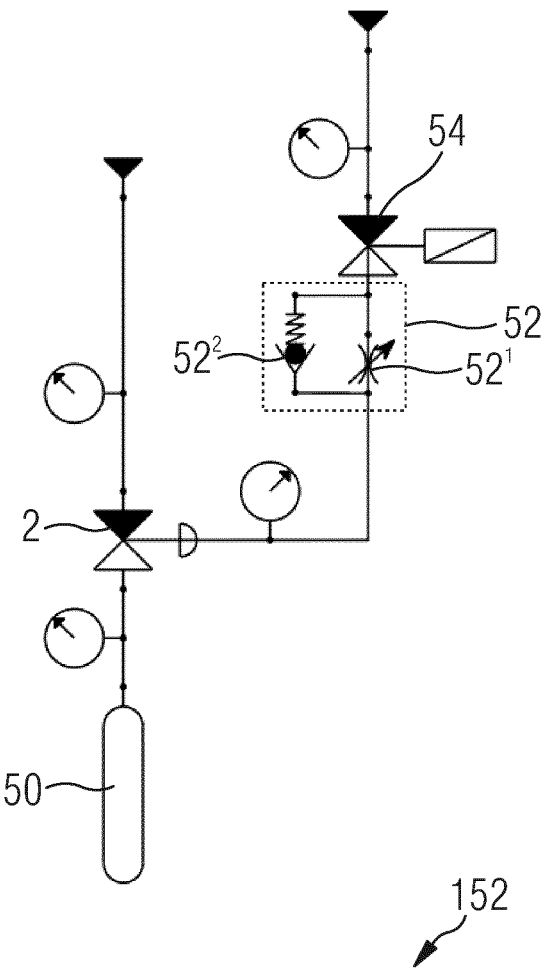
FIG. 3 shows a diagram of a system for delivering gas from a gas cylinder, in accordance with various embodiments of the invention.

FIG. 3 illustrates a diagram of a system for delivering or outputting gas from a gas cylinder. The system comprises a valve 2 with a pneumatic actuator that comprises a pneumatic actuating chamber receiving a piston and an auxiliary fluid, like oil or any other liquid, that amplifies the pneumatic force produced on the piston. It comprises a restriction and a check-valve both arranged in parallel, so as to limit the flow of the auxiliary fluid when opening the valve. That actuator can be in accordance with the actuator 20 of FIGS. 1 and 2. The valve 2 is mounted on, or connected to, the gas cylinder 50. The system comprises also a pneumatic control unit 52 that controls the flow of pneumatic air that actuates the valve 2. An electromagnetic valve 54 is arranged between the pneumatic control unit 52 and a compressed air source. That source can be a usual one, at a pressure comprised between 5 and 10 bar.

The pneumatic control unit 52 comprises essentially a flow restrictor $52^1$ and a check-valve $52^2$. Both are mounted in parallel and the check-valve $52^2$ is oriented so as to close and thereby block a flow of air from the compressed air source to the actuator, and therefore force it through the flow restrictor $52^1$. The check-valve opens and thereby allows the flow of air from the actuator to the environment of the system through the valve 54.

For opening the valve, the electromagnetic valve 54 is opened so that the compressed air flows through the flow restrictor $52^1$, the check-valve $52^2$ being closed. The pressure in the actuating pneumatic chamber increases then progressively to reach a pressure close to the pressure of the compressed air source. The valve can be a normally close valve against the resilient force of a spring or any other resilient means. While the pressure increases in the pneumatic actuating chamber, the resulting effort in the opening direction reaches the resilient effort of the spring and thereby progressively opens the valve.

The presence of a flow restrictor in the passage of the auxiliary hydraulic fluid, in addition to the flow restrictor $52^1$ in the pneumatic control unit 52, provides an additional interesting effect for obtaining a slow opening movement of the valve. Indeed, the flow restrictor $52^1$ can then be dimensioned larger so as to more rapidly fill the actuating chamber. The time for filling the chamber until reaching a pressure high enough to open the valve is indeed a time that does not count to the opening time.

For closing the valve, the valve 54 is switched to a state where it closes the source of compressed air and connected the pneumatic actuating chamber with the ambient. The air in the actuating chamber flows out of the chamber through the check-valve $52^2$, by-passing the flow restrictor $52^1$. The valve closes therefore rapidly, contrary to the opening movement.

Figure 4:
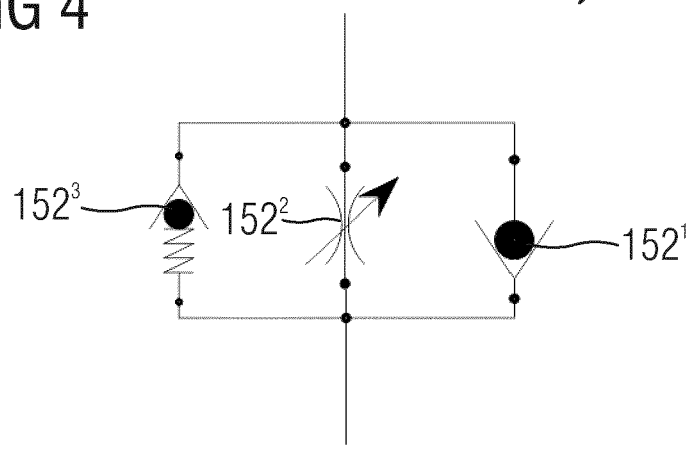
FIG. 4 shows an alternative of the pneumatic control unit of the diagram of FIG. 3, in accordance with various embodiments of the invention.

For reducing the time for filling the actuating chamber with the compressed air, the pneumatic control unit 52 of FIG. 3 can be replaced by the unit 152 of FIG. 4. Similarly to the unit 52 of FIG. 3, the unit 152 comprises a flow restrictor $152^1$ and a check-valve $152^2$, both being mounted in parallel. It comprises, in addition, a calibrated valve $152^3$ that is configured to open only when the difference of pressure between the compressed air source and the actuating chamber is greater than a first value. That value can be comprised between 2 and 10 bar, in various instances between 3 and 8 bar, for example between 4 and 6 bar. This means that at the beginning of the opening operation, the pressure in the actuating chamber is close to zero so that the difference of pressures on both sides of the valve $152^3$ is high enough for the valve to open and permit a rapid filling of the chamber until it reaches a pressure of a second value that is close to the pressure necessary for starting opening the valve. The calibrated valve $152^3$ closes then and the compressed air flow then only through the flow restrictor $152^1$.

The invention claimed is:

1. A valve actuating device, said valve actuating device comprising:
   a body with a bore and a bottom;
   an actuating element sealingly housed in the bore of the body and forming a first chamber with the bottom of the body;
   a piston with a portion sealingly extending through a bore in the actuating element, the portion and bore of the actuating element delimiting a second actuating chamber;
   an auxiliary fluid in the first and second chambers; and
   an auxiliary fluid passage between the first and second chambers so that a movement of the piston in the bore of the actuating member can increase the pressure in the first chamber and move the actuating element, wherein
   the auxiliary fluid passage between the first and second chambers comprises a restriction and a check-valve, both arranged in parallel, so as to limit the flow of the auxiliary fluid from the second chamber to the first chamber.

2. The valve actuating device according to claim 1, wherein the actuating element comprises a grip portion to be attached to a movable element of the valve, the grip portion sealingly protruding through an opening of the bottom of the body, at least one of the restriction and the check-valve being arranged on a face of the actuating element that is in vis-à-vis with the bottom of the body and that surrounds the grip portion, wherein the restriction and the check-valve are arranged at distinct locations at the periphery of the grip portion, the distinct locations being opposed diametrically.

3. The valve actuating device according to claim 1, wherein the fluid passage between the first and second chambers comprises an internal groove in the bore of the actuating element.

4. The valve actuating device according to claim 3, wherein the bore of the actuating element comprises a bottom, the internal groove being at the bottom, and the distance between a or the face of the actuating element that is in vis-à-vis with the bottom of the body and the groove at the bottom level is less than 6 mm.

5. The valve actuating device according to claim 3, wherein at least one of the restriction and the check-valve has a longitudinal axis that forms an angle of less than 30° with a longitudinal axis of the bore and the groove of the actuating element.

6. The valve actuating device according to claim 3, wherein the actuating element comprises at least one offset bore on a or the face of the actuating element that is in vis-à-vis with the bottom of the body, the at least one offset bore intersecting the groove and housing the check valve or a plug with a restricted drill hole forming the restriction.

7. The valve actuating device according to claim 3, wherein the restriction is formed by a drill hole extending from a or the face of the actuating element that is in vis-à-vis with the bottom of the body, to the groove.

8. The valve actuating device according to claim 1, wherein the restriction comprises an average diameter that is less than 0.5 mm.

9. The valve actuating device according to claim 1, wherein the check valve is configured so as to open when the auxiliary fluid flows from the first chamber to the second chamber.

10. The valve actuating device according to claim 1, wherein the auxiliary fluid in the first and second chambers is liquid.

11. The valve actuating device according to claim 1, wherein the auxiliary fluid in the first and second chambers is a silicone based liquid.

12. The valve actuating device according to claim 1 further comprising a spring urging the actuating element against the bottom of the body, the spring comprising a stack of Belleville disk springs.

13. The valve actuating device according to claim 1, wherein the portion of the piston that extends through the bore of the actuating member is a first portion, the piston comprising a second portion of a larger diameter and sealingly housed in a further bore, the further bore and second portion delimiting a third chamber with a port for compressed air for moving the piston towards the bottom of the body.

14. The valve actuating device according to claim 13, wherein the port for compressed air comprises a device that restricts a passage through said port when the air flows to fill the third chamber and that essentially does not restrict the passage when the air escapes from the chamber.

15. The valve actuating device according to claim 13, wherein the diameter of the second portion of the piston is at least 2 times larger than the diameter of the first portion.

16. The valve actuating device according to claim 13, wherein the actuating element comprises a grip portion to be attached to a movable element of the valve and wherein the bore of the body that houses the actuating element, the bore of the actuating element, the grip portion, and, the further bore of the body, are aligned.

17. A valve for a fluid, said valve comprising:
a seat;
a closure member that is movable in translation along a main axis for cooperating with the seat for shutting-off of a fluid passage; and
an actuating device for actuating the closure member, wherein
the actuating device comprises
a body with a bore and a bottom;
an actuating element sealingly housed in the bore of the body and forming a first chamber with the bottom of the body;
a piston with a portion sealingly extending through a bore in the actuating element, the portion and bore of the actuating element delimiting a second actuating chamber;
an auxiliary fluid in the first and second chambers; and
an auxiliary fluid passage between the first and second chambers so that a movement of the piston in the bore of the actuating member can increase the pressure in the first chamber and move the actuating element, wherein
the auxiliary fluid passage between the first and second chambers comprises a restriction and a check-valve, both arranged in parallel, so as to limit the flow of the auxiliary fluid from the second chamber to the first chamber.

18. The valve according to claim 17, wherein the movement of the actuating element, when the auxiliary fluid flows from the second chamber to the first chamber, opens the passage.

19. A system for outputting a gas stored in a compressed state in a gas cylinder, wherein the system comprises:
a valve, wherein the valve comprises:
a seat;
a closure member that is movable in translation along a main axis for cooperating with the seat for shutting-off of a fluid passage; and
an actuating device for actuating the closure member, wherein
the actuating device comprises
a body with a bore and a bottom;
an actuating element sealingly housed in the bore of the body and forming a first chamber with the bottom of the body;
a piston with a portion sealingly extending through a bore in the actuating element, the portion and bore in the actuating element delimiting a second actuating chamber;
an auxiliary fluid in the first and second chambers; and
an auxiliary fluid passage between the first and second chambers so that a movement of the piston in the bore of the actuating member can increase the pressure in the first chamber and move the actuating element, wherein
the auxiliary fluid passage between the first and second chambers comprises a restriction and a check-valve, both arranged in parallel, so as to limit the flow of the auxiliary fluid from the second chamber to the first chamber;
wherein the portion of the piston that extends through the bore of the actuating member is a first portion, the piston comprising a second portion of a larger diameter and sealingly housed in a further bore, the further bore and second portion delimiting a third chamber, and a pneumatic control unit to be pneumatically connected between a compressed air source and the third chamber of the actuating device of the valve, the pneumatic control unit comprising a flow restrictor and, in parallel, a check valve oriented such as to close when filling the third chamber so as to force the compressed air towards the flow restrictor, and to open when emptying the chamber so as to by-pass the restrictor.

20. The system according to claim 19, wherein the pneumatic control unit further comprises a calibrated valve in parallel to the check valve and the flow restrictor, the calibrated valve being configured to open and by-pass the flow restrictor and the check valve during filling of the chamber as long as the difference of pressure between the compressed air source and the third chamber is above a first value, wherein at least one of:

the first value is comprised between 2 and 10 bar; and the calibrated valve is configured to close when the pressure in the first chamber is above a second value, the second value being comprised between 1 and 5 bar.

\* \* \* \* \*